US005946466A

United States Patent [19]
Adiga et al.

[11] Patent Number: 5,946,466
[45] Date of Patent: Aug. 31, 1999

[54] SYSTEM AND METHOD FOR DETERMINISTIC RESPONSE TO AUDIO/ VIDEO COMMANDS IN A MULTIMEDIA SYSTEM

[75] Inventors: Ashok Kakkunje Adiga; Janice Marie Girouard; Wade David Shaw, all of Austin, Tex.

[73] Assignee: International Business Machines Corporation, Armonk, N.Y.

[21] Appl. No.: 08/753,567

[22] Filed: Nov. 26, 1996

[51] Int. Cl.[6] .................................................. G06F 13/00
[52] U.S. Cl. ................................ 395/200.61; 395/200.55
[58] Field of Search .............................. 455/4.1, 4.2, 5.1; 348/4.2, 6, 7, 12, 13, 3; 395/200.61, 200.55

[56] References Cited

U.S. PATENT DOCUMENTS

| | | | |
|---|---|---|---|
| 5,528,513 | 6/1996 | Vaitzblit et al. | 364/514 |
| 5,603,058 | 2/1997 | Belknap et al. | 395/855 |
| 5,761,430 | 6/1998 | Gross et al. | 395/200.55 |
| 5,761,692 | 6/1998 | Ozden et al. | 711/4 |
| 5,764,961 | 6/1998 | Bhat | 395/500 |
| 5,784,647 | 7/1998 | Sugimoto | 395/859 |

OTHER PUBLICATIONS

Operating Systems Design and Implementation, Tanenbaum, A., Prentice–Hall, p. 501, 1987.
Semiconductor Memories, a Handbook of Design, Manufacture and Application, 2 ed., Prince, B., John Wiley & Sons. pp. 460–461, 1995.
Dictionary of Computing, 4 ed., Oxford University Press, pp. 259–260, 1996.

*Primary Examiner*—Ellis B. Ramirez
*Assistant Examiner*—William Titcomb
*Attorney, Agent, or Firm*—Robert M. Carwell

[57] ABSTRACT

In a multimedia data stream system, deterministic response is provided by multimedia servers for VCR client commands, thereby ensuring the commands execute within a predetermined deterministic window of a base response time +/− a jitter j. A command is timestamped and blocked until within the determinstic response window, and then released from a queue. An I/O then issues to a decoder card in a time period less than 2j. Threads processing these commands run at elevated priority. Non-deterministic commands default to the high priority but priority of a thread receiving such a command is lowered before processing. The response time jitter is bound by high priority commands by issuing only non-blocking I/Os and limiting the number of concurrent SCSI bus commands.

18 Claims, 4 Drawing Sheets

SYSTEM AND METHOD FOR DETERMINISTIC RESPONSE TO AUDIO/VIDEO COMMANDS IN A MULTIMEDIA SYSTEM

TECHNICAL FIELD

This invention relates to multimedia system environments and, more particularly, to techniques for efficient processing of commands in such systems.

BACKGROUND OF THE INVENTION

In the multimedia field and other related fields involving digitized data streams, including video content and the like for example, a user or application may desire to control the media streams in some fashion. As but one example, in video-on-demand systems, a user may desire to be able to issue commands from a network PC or "set-top box" to control playback of a selected movie title reposing at an audio/video server. Such control perhaps may desirably take the familiar form of conventional VCR transport commands, such as play, pause, stop, and record.

In yet another example in the broadcast industry, a TV studio may require the capability of transmitting a plurality of channels of video content and to interpose commercials at prescribed intervals. In such an application, user commands from a programming manager or automatic commands originating from pre-programmed user input in a program executing on an application server may, in like manner to the video-on-demand system VCR commands, be desired to facilitate the playback occurring at the appropriate desired times.

In prior such systems, it was conventional to be content with accepting non-deterministic response times for such commands. In other words, one might desire a command to be executed no later than perhaps one second after its issuance, however there was no assurance that this would happen.

Although this deficiency alone of simply not being able to count on VCR commands executing at a certain time is unacceptable in many applications, in some applications this problem is often exacerbated and compounded in a way not readily apparent. Continuing with the television studio example, it is a characteristic of the industry to reserve very precise timeslots or windows in which certain content is to air, such as station breaks and ids and commercials of predetermined lengths.

Due to network constraints and the like, it is completely unacceptable only to know that a command for example to "Play" will occur before n milliseconds so that it is assured of occurring on or slightly before the hour.

Rather, it may be highly desirable to provide for both a lower bound as well as an upper bound so the station may satisfy commercial customers and maintain precise scheduling of program content and commercials. Commercial airtime is notoriously extremely expensive and often can be valued in the thousands of dollars per second. Inadvertent clipping of commercials or program time can result in irate sponsors, and expensive "make goods" being offered to the customer, not to mention irate viewers who have had the beginning of their favorite show "walked on" by an ill-timed commercial. Thus, some mechanism would be desirable to ensure that VCR commands would execute within a known, deterministic range or window of, for example, 900 milliseconds–1100 milliseconds.

In such multimedia systems, it is also conventional to handle multiple output data streams. Accordingly, it is also conventional to provide in such systems a plurality of output video decoders. Yet an additional serious problem which arises in such systems relative to these decoders is that in such conventional systems, decoders essentially compete for the same resources while possibly running at different rates. In such a case, instances frequently arise in which some of the cards may get starved by other cards wherein they essentially have no data stream data to output. This obviously severely impacts the throughput of the entire system. Accordingly, it further would be desirable to provide an efficient mechanism for minimizing the chances of starvation of such decoders.

Still another problem arises in conventional implementations of multimedia systems. Typically in such systems a bus protocol is provided, interfacing between various output decoder cards and the data stream system. A representative such bus is the familiar small computer system interface or "SCSI" bus. Such buses have traditionally been "unfair" in the sense that they exhibit the undesirable property that devices with high SCSI priorities can monopolize the bus when bus utilization becomes high. This contention from the SCSI bus seriously impacts the ability to schedule I/Os in an optimal sequence. Accordingly, mechanisms were also sorely needed for enforcing bus fairness in such multimedia systems.

SUMMARY OF THE INVENTION

In a multimedia data stream system, deterministic response is provided by multimedia servers for VCR client commands, thereby ensuring the commands execute within a predetermined deterministic window of a base response time +/− a jitter j. A command is timestamped and blocked until within the determinstic response window, and then released from a queue. An I/O then issues to a decoder card in a time period less than 2j. Threads processing these commands run at elevated priority. Non-deterministic commands default to the high priority but priority of a thread receiving such a command is lowered before processing. The response time jitter is bound by high priority commands by issuing only non-blocking I/Os and limiting the number of concurrent SCSI bus commands.

DETAILED DESCRIPTION OF THE PREFERRED EMBODIMENT

Figure 1:
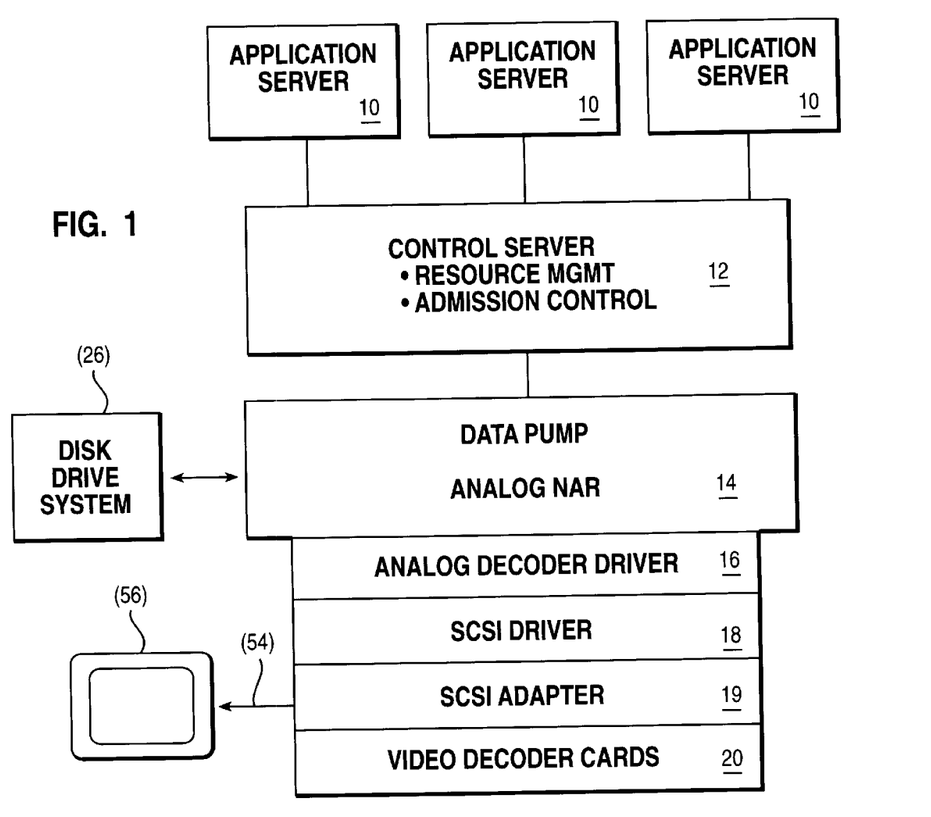
FIG. 1 is a functional block diagram of a multimedia system in which the invention is employed.

Turning to FIG. 1, depicted therein is a representative multimedia streamer system environment in which the invention is advantageously employed. First, a plurality of application servers 10 are shown which may take a wide variety of forms and which communicate through application program interfaces to a multimedia data stream system including components 12–20. The VCR commands previously described may enter the system of FIG. 1 in a variety of ways. With respect to a video-on-demand application for example, such a VCR command might originate from a set-top box transmitted through an appropriate cable network and communication switch such as an ATM switch and eventually enter one of the application servers 10.

As another example, an application server may be executing a program which controls the timing of programs and commercials from a broadcast network or TV station in response to a playlist constructed with user input. In this instance, the VCR transport commands would be generated automatically as a result of execution of this program on the server 10 and delivered to the control server 12. Thus, in this instance the video stream API commands would be originating solely from the server 10 and delivered to the control server 12.

A control server 12 is provided connected to the servers which has two main tasks. First, the server will control the management of all of the resources below box 12 in FIG. 1. For example, it is responsible for knowing what is going on in the disk array or disk driver system 26 and further controls what is transpiring in the data pump 14. The second function of the control server 12 is one of admission control. When additional control signals are received by the control server 12 from the applications servers 10, this function determines for example if, based upon the resource management function, enough resources are available to service the command and to open a new data stream.

The control server 12 controls a data pump 14 whose main purpose is to set up pipes between input and output sides of the pump. The data pump will handle different pipes, depending on the application. For example, it might set up a pipe to handle data incoming from a network which is outbound from the system of FIG. 1 onto the net. Or, it may set up a pipe as required to handle data coming in from the net and being sent out to the disk drive system 26 if data is to be recorded. Perhaps a more common situation might be a case wherein a video title is resident on the disk drive system 26 and serves as an input to the data pump 14. This video data stream would then be piped by the data pump 14, in one application to an output system such as the analog system 16–20, depicted in FIG. 1. This analog data stream eventually would be delivered on cable 54 to a suitable display device 56 such as a conventional television. The invention of course is not limited to such analog output, but rather also contemplates output in digital form as required by the particular application.

Still referring to FIG. 1, in the illustrative case in which analog output data is contemplated, the data pump 14 will include as a subcomponent an analog network access routine (NAR). Such a NAR is essentially a software interface to hardware, e.g., various adapter cards, with a different NAR being provided dependent upon the type of card and network the data pump 14 is communicating with. Although an analog NAR is shown and corresponding analog components 16–20 such as the analog video decoder card 20 or ADEC card, these components may vary in a different application, dependent upon the need. For example, instead of an analog NAR or ADEC NAR, in the case of digital output an ATM NAR might be included. In the latter case, rather than an ADEC card 20 talking to an ADEC NAR, an ATM adapter card would be provided for communication with the corresponding ATM NAR. In like manner, an RTP NAR may be provided with a corresponding Ethernet or Token Ring card for providing communication between the RTP NAR and the Ethernet or Token Ring card. The various NARs just discussed and provided as a subcomponent in the data pump 14 are employed when the data pump communicates directly with its corresponding hardware adapter card. In some instances obtaining data from the disk drive system 26 and transferring it through such a NAR and corresponding card does not provide a fast enough data rate. Alternate faster paths may then be provided in the kernel of the operating system. In other words, a pipe may alternatively be set up as required, sending data directly between the disk arrays and the particular card utilizing a "zero copy" technique.

Continuing with FIG. 1, depicted therein (in the analog application described herein) is an analog decoder driver 16. This is simply the device driver for the video decoder card 20 and will differ depending upon which adapter card 20 is used as previously described. In other words, a different device driver is employed, running on the operating system of the system of FIG. 1 based upon which card 20 is being employed. Key changes to what would otherwise be a conventional device driver 16 are made in accordance with the invention to be hereinafter described, which support novel aspects of the invention relating to deterministic response for VCR commands and priority scheduling.

The system of FIG. 1 further includes a driver which in this case is an SCSI driver 18, a conventional driver for an SCSI bus and associated off-the-shelf SCSI card 19, which connects to one or more decoder cards 20. The invention of course is not intended to be limited to any particular bus structure such as an SCSI bus.

Figure 2:
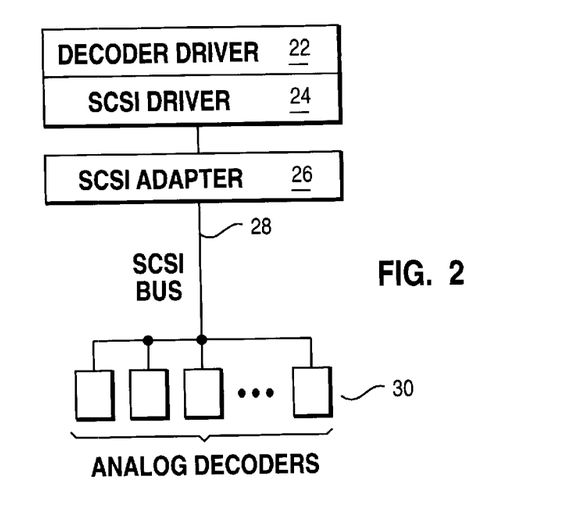
FIG. 2 is a more detailed functional block diagram of selected components of FIG. 1.

Turning to FIG. 2, this is simply a more detailed illustration of the lower components of FIG. 1. A decoder driver 22 is employed which corresponds to the analog decoder driver 16 of FIG. 1. This in turn drives conventional bus driver which in the case of FIG. 2 is an SCSI driver 24 which in turn communicates directly ith an adapter corresponding to the particular bus and bus protocol selected. Thus, in this case, the adapter would be an SCSI adapter 26 corresponding to the video decoder card 19 of FIG. 1. This adapter card would communicate across the corresponding bus, in this case the SCSI bus 28 to one or a plurality of corresponding analog decoders 30, which in like manner correspond to the video decoder card 20 which outputs analog signals on the line 54 to the appropriate end user.

Figure 3:
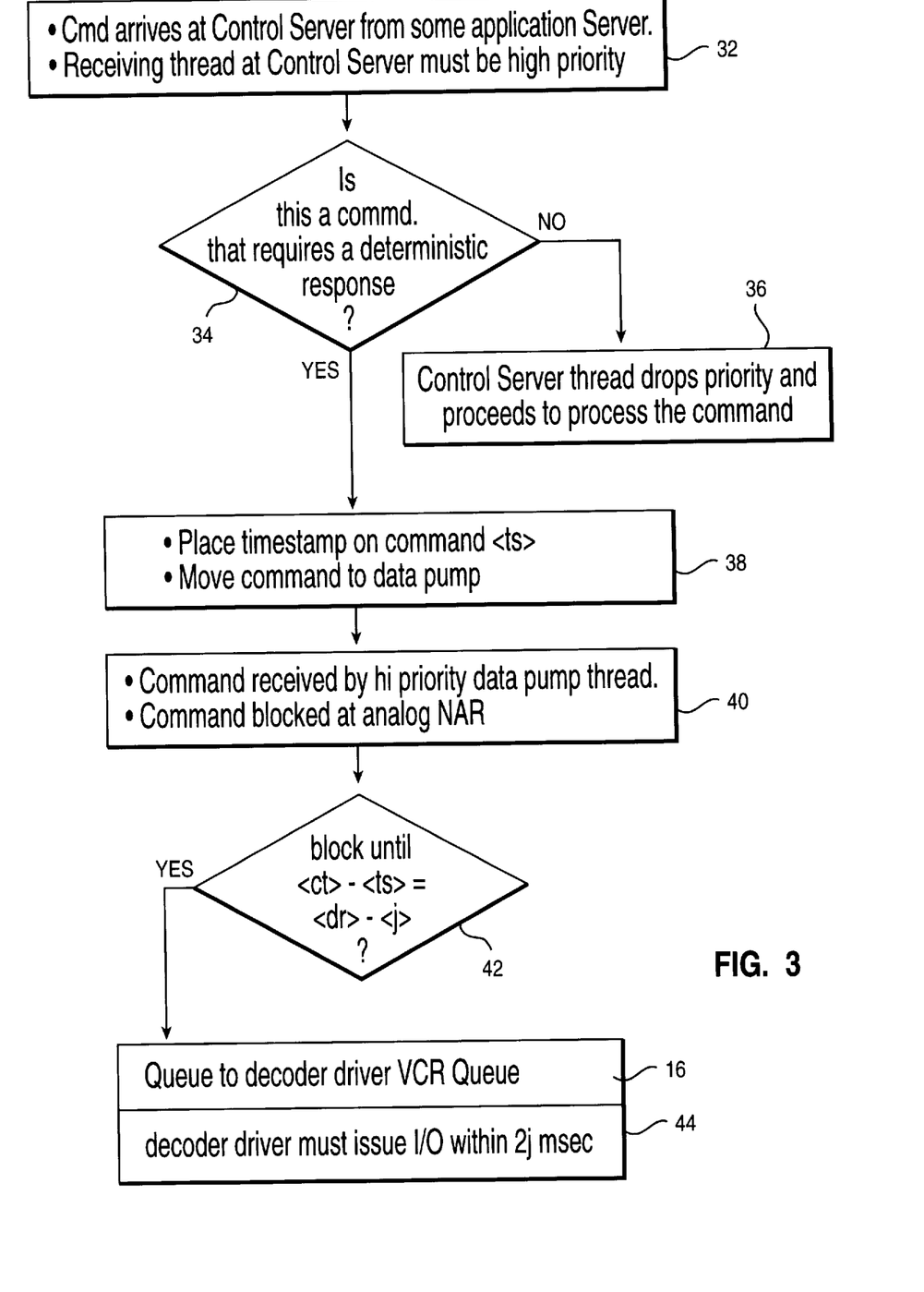
FIG. 3 is a flow diagram of one implementation of deterministic play command processing employed as program code executing in the system of FIG. 1.
Figure 4:
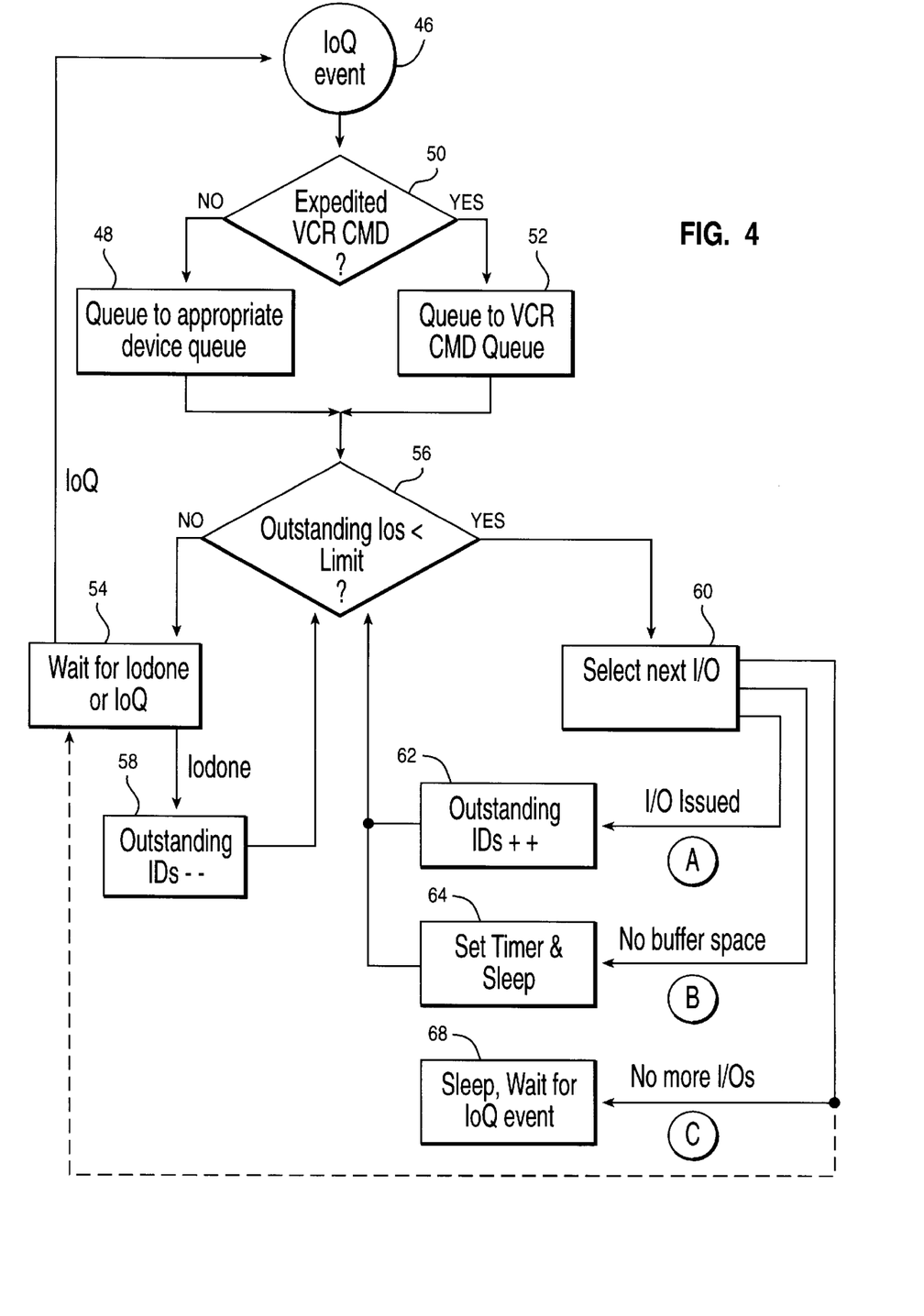
FIG. 4 is a flow diagram of a decoder driver component of FIG. 1 implemented in program code executing in the system of FIG. 1.
Figure 5:
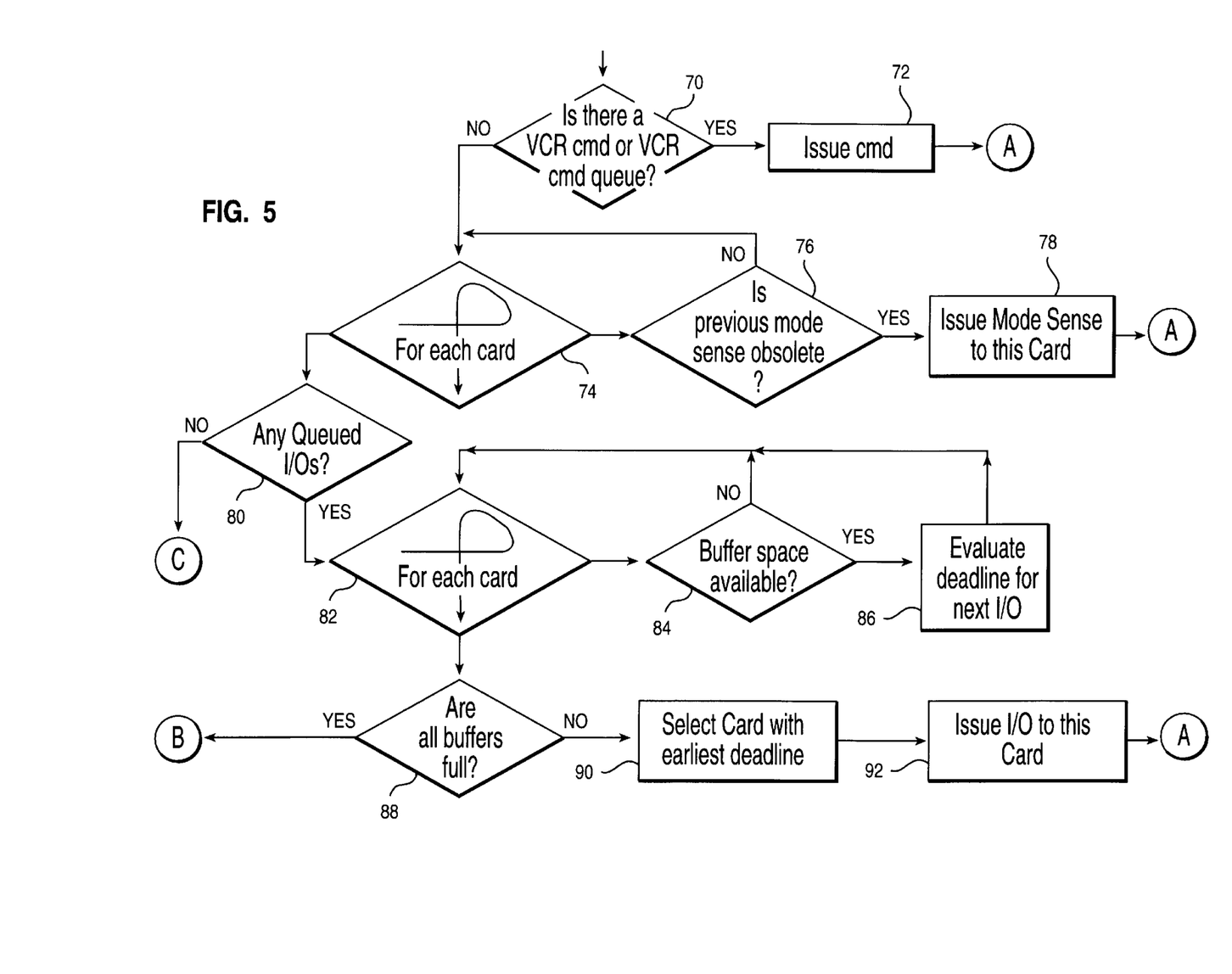
FIG. 5 is a flow diagram of a process for selecting a next I/O implemented in program code executing on the system of FIG. 1.

It will appreciated that because of delays in networks carrying VCR commands, further delays in the server 10, and the like, precise control over when these commands might otherwise execute in conventional systems is impossible until the advent of the system herein described, including the components 12–20 and, in particular, the novel program code represented in FIGS. 3–5 executing thereon. The invention in part provides for a deterministic response for such VCR commands provided in the program code executing in the components 12–16 (it will be recalled that the driver and associated card 18 and 19 respectively may essentially be off-the-shelf components inasmuch as a desirable design criteria is to avoid wherever possible changing general purpose and generally available components). To permit deterministic response times to take interconnect network delays between servers 10 and 12 in FIG. 1, the timestamp signifying the start of the deterministic response time window should be placed within server 10. There is an additional requirement that servers 10 and 12 use some appropriate mechanism known in the art to synchronize their clocks.

A general description will now be provided of the "deterministic" response feature of the system herein described and how it is implemented. This will be followed by a description in more detail of the program code which may be implemented from the flow diagrams of FIG. 3, 4, and 5 and executed on the system of FIG. 1 so as to effect this desired deterministic response.

A deterministic response requirement for VCR commands (e.g., play, pause, stop, record). Put simply, is that a VCR command should always have a fixed response time window in the system in which the invention is implemented. It will be recalled that one serious weakness of prior art systems is that it was impossible to know with any degree of certainty when such a command might execute, thereby causing all manners of problems regarding reliable scheduling of programs, commercials, etc., for example in one representative application.

An example of a specification for a "deterministic" response time might be that the response time represented as <dr> must be within a window of 300 milliseconds +/−40 milliseconds, thereby specifying a window a range of acceptable response times for a VCR command in the interval [260, 340]. In a more generalized form, the definition of a "deterministic" command response is that the command should complete in a fixed response time window expressed generally as a base response time +/− a "jitter". Mathematically, this may be represented by <dr>= [<brt>]+/−<j>], where <brt> is the base response time and <j> is the jitter allowed.

As previously noted, before addressing the general approach of the invention with respect to detailed flow diagrams, a general description of the process will first follow. Deterministic response is achieved by essentially moving the VCR commands as quickly as possible through the system of FIG. 1 in an attempt to get them to the output side of the pipe in a time period less than the lower bound [<brt>−<j>] of the response window. When the VCR command enters the system, e.g., the control server 12 of FIG. 1, it is timestamped. When it reaches the analog video decoder NAR (a subcomponent of the data pump 14), the command is then blocked until it is in the deterministic response window. At this time, it is released from the queue and an I/O is issued to the decoder card 20 in a time period less than the allowed jitter 2j.

To ensure that VCR commands pass through the system of the invention do so with little or no delay, all such threads that process the VCR commands will be made to run at an elevated priority with respect to other threads in the system. When a pool of threads which handle both deterministic and non-deterministic commands exist, all such threads default to the high priority. When a thread actually receives a command without a deterministic response requirement, its priority is lowered to an acceptable level before continuing to process the command, thereby ensuring that the VCR commands in need of high priority will be processed first.

The device driver in the system of the invention for driving the output cards such as the video decoder card will bound the maximum time the particular VCR command must wait after it is released from a queue by limiting the number of outstanding I/Os on the bus, such as an SCSI bus, disposed between the driver and the decoder card. The actual number of concurrent I/Os permitted on such a single bus will depend upon the amount of jitter permitted in the deterministic response requirement. For example, if each data I/O to an analog decoder card takes 20MS and the deterministic response time required is 300+/−50MS, the response window is 2j or 100MS. Accordingly, the VCR command could wait for four data I/Os to complete before it could be issued. The device driver herein described therefore will limit the number of concurrent I/Os on the SCSI bus to a predetermined number such as four in order to meet the deterministic response requirement.

A side effect of allowing a limited number of such I/Os is that all I/Os issued should be non-blocking to avoid the scheduler hanging at a time when a deterministic command arrives. This is effected by the device driver herein described always keeping track of the state of each decoder card and, in particular, the number of free buffers in such cards which can accept input data. The driver thereby ensures that a particular decoder card will not block when a write i/O is issued to it.

Also in accordance with the invention, all I/Os will be prioritized by earliest deadline. VCR commands in the system herein described will have the highest priority (e.g., deadline=0), whereas write commands will have priorities based upon their consumption deadline, which will be a function of the data stream rate and the number of buffers of data already on a decoder card. The write with the earliest deadline will be the next I/O issued. The device driver polls the cards at regular intervals (in the specific implementation described by issuing a "modesense" command hereinafter described in greater detail) in order to dynamically estimate the amount of filled data buffers in each card. This is then used to generate deadlines for each card, specifying the time by which the particular card must have its next block of data in order to avoid dropping a frame and thereby causing a loss of quality of service (QOS). The device driver will then utilize an earliest deadline first or EDF scheme in order to schedule the next I/O on the bus.

Turning now to FIG. 3, now that a general description of the system has been provided, a more detailed description of the software components thereof follows. First, as indicated at block 32, it will be assumed that a command has arrived as control server 12 from an application server 10 and is received by a receiving thread at the control server. A strategy of the system is to send such a VCR command at as high a priority as is feasible and to process it through to the output side of the data pump 14 as quickly as is feasible, given the deterministic nature of the command. In passing it will be noted that the implementation depicted in FIG. 3 is of a deterministic "play" command. However the invention is not intended to be so limited to a particular such command but admits to application to any other command in a multimedia system.

Returning to FIG. 3 and step 32, the reason that the thread at the control server 12 must be at a high priority is so that it will not be blocked by commands relating to other functions occurring in the system. Inasmuch as it is important to process the command as rapidly as feasible.

Step 34 indicates that this high priority thread will then determine whether the thus-received command requires a deterministic response. If it is a conventional command not requiring such a deterministic response, the flow exits block 34 to block 36 wherein the control server thread priority is dropped back to the normal level and the thread proceeds to process the command in a normal manner.

On the other hand, if the check at block 34 indicates that the command indeed one which requires a deterministic response, flow exits out the bottom of block 34 to step 38. At this point, a timestamp <ts> is placed on the command corresponding to the arrival time of the timestamp. The reason for this is that the timestamp will be utilized later, based upon this arrival time to determine the necessary required response time to the command. The command is then moved from the control server 12 to the data pump 14 as per step 38, and flow proceeds to step 40. As indicated at block 40, the command is then received by the data pump and, more particularly, by a high priority data pump thread for the same reason that the receiving thread at the control server is high priority, e.g. because if it is received by a low priority data pump thread, the command may be blocked behind other higher priority commands.

In the implementation herein described, a single high priority data pump thread is provided receiving all commands from the control server 12, and the data pump program code then determines whether the tasks required by the command require high priority or not (similar to step 34). If high priority is required, the data pump elevates the priority of a different thread and passes the command to the thread. In this manner, it is guaranteed that the Play command will be processed in the data pump 14 at the highest priority.

The analog NAR component of the data pump 14 will check, based upon the reliable timestamp placed upon the command in step 38 for two factors. First, it will be determined whether the command may still be executed within the deterministic window. In most cases the command will arrive at this point before the deterministic time window due to the strategy of employing high priority threads previously described. Secondly, the analog NAR will determine how long the command's thread must be blocked by the analog NAR so that the command will be executed no sooner than the required initial time specified by the deterministic window as shown at step 40. The blocking of the command at the analog NAR may be affected by placing it in a queue with a timestamp indicating when the command thread must be woken up for further processing.

Continuing with FIG. 3, at step 42, this block simply indicates that the command will stay blocked until the lower end of the window is reached. Until this occurs, the process blocks at 42. However, when the condition is reached of <ct>−<ts>=<dr>−<j> (where <ct> is the current time), signifying that the lower end of the window has been reached, flow exits block 42 and proceeds to step 44. At step 44, the command is queued to the decoder driver 16 in a VCR queue. The reasons for a special VCR queue is that the decoder driver 16 is also getting regular MPEG data coming in which it is writing to the card and consequently the decoder driver must know that the Play command is high priority, and consequently the command is queued in a dedicated VCR Queue. From the time the command gets released in block 42, the process has just entered the tip of the jitter (i.e., <dr>−<j>), and thus only a time of 2j is available for issuance of the I/O Play command by the decoder driver in order to comply with the deterministic response requirement, e.g., the decoder driver 16 only has a time of 2j in which to issue the I/O to be sent to the decoder card 20. Consequently, to ensure that the command is not blocked behind other commands being processed by the decoder driver 16, the VCR queue is implemented so that the driver 16 issues the I/O within the aforementioned 2j timeframe.

Turning now to FIGS. 4 and 5, the flow diagram indicates the aspects of the decoder driver 16 to ensure that the constraint is met that the command be issued from the driver 16 within the 2j window. One of the important functions of the device driver implementation herein described is to ensure a <2j response time for a VCR command. However, prioritization features are also included in the implementation used to advantage with respect to the remaining data stream, e.g., other than the VCR commands, to ensure that a desired quality of service (QOS) is maintained. This latter is another significant requirement of systems such as that herein described so as to avoid dropping frames and the like. These latter features are also incorporated into the embodiment described herein with reference to the device driver flow depicted in FIGS. 4 and 5.

First, with respect to the components of FIG. 4 which effect meeting the 2j constraint, a general description of the technique will first be provided. Obviously, every data I/O takes a finite amount of time. If a Play or other VCR command is received at a time when it is queued behind a number of other commands, potentially the system could take the amount of time required to issue these other commands before attending to issuance of the VCR command for which higher priority is required. Specifically, as an illustration of the foregoing, a data write in a system such as that described herein may require nominally 15 milliseconds to execute, whereas a Play command may only a millisecond. If it is supposed that a Play command enters the driver 16 at a time when the driver has just issued 14 of these write commands to a corresponding 14 adapter cards to which the driver 16 is talking, in a worst case the driver could be issuing 14 I/O commands, e.g., one to each card, thereby consuming 14×15 milliseconds=210 milliseconds, thereby exceeding the size of the deterministic window. Normally, this situation would be beyond the control of a conventional device driver inasmuch as once the I/O commands are issued, they are gone, and the results are no longer under control of the device driver inasmuch as it must await completion of the writes. Accordingly, the Play command must await expiration of this 210 milliseconds before it can get issued by the device driver.

With the foregoing in mind, the approach presented in the embodiment herein described is to reduce the number of conventional I/Os allowed at any time to go out on the bus 28 (FIG. 2). In other words, the design philosophy represented in FIGS. 4 and 5 is to control the number of outstanding I/Os permitted on the bus 28. In conventional operation of a device driver such as an SCSI driver 24, as many I/Os are permitted as desired, e.g., the number is unbounded. In a departure from this conventional practice, however, it is a feature of the system herein described to delimit the number of outstanding I/Os to a predetermined number so as to still make it possible to meet the deterministic jitter requirement. As a numerical example, if it is assumed that the 2j jitter window is 64 milliseconds, this would suggest that perhaps only two or three 15 millisecond writes be permitted. This is because in a worst case analysis, conceivably 14 high priority Play commands might be received at the same time, requiring 14 milliseconds to execute. Accordingly, at any given time, the time required to execute the number of queued writes plus the worst case of 14 milliseconds for 14 consecutive Play command executions must not exceed the jitter window of 64 milliseconds, in that the Play commands would consume 14 milliseconds, this would leave only 50 milliseconds for execution of write I/O commands. Inasmuch as each write command consumes 15 milliseconds, this is turn would suggest that the number of outstanding conventional I/O commands be limited to perhaps two or three (e.g., consuming 30 to 45 milliseconds) so as to leave adequate time for execution of the worst case of the 14 consecutive play commands.

Returning to FIG. 4, block 46 indicates that an I/O queue event has occurred. This new I/O queue event could either correspond to a VCR command for which a deterministic response time is required or it could be a write command or even some other VCR command for which a deterministic response time is not required. Block 50 is provided to determine which such command has been received, e.g., an expedited VCR command requiring deterministic treatment (in which case flow exits to the right to block 52) or a non-expedited command (in which case flow exits to the left of block 50 to block 48). In block 52, because an expedited VCR command has been received, this I/O queue event is queued to the VCR CMD Queue referenced in block 44 of FIG. 3. As previously described, because these are high priority commands, they are separated into their own unique high priority queue as distinguished from the commands filtered by block 50 and passed to block 48. Block 48 indicates that these non-high priority events are queued to appropriate conventional device driver queues, e.g., a normal device queue wherein there is simply one queue per device.

Continuing with FIG. 4, the function represented at block 56 is intended to determine whether an additional I/O can be issued at the present time. This is true if the number of outstanding I/Os is less than a predetermined limit. This limit at step 56, specifies the maximum number of outstanding I/Os which the system can have at any given time on the bus. If the limit has been reached, flow executes to the left of box 56 to step 54. This simply signifies that no additional I/Os can be issued at the present time, even though I/Os are present to be issued, and consequently a wait loop is entered. When an I/O is done, 54, this in turn signifies that another I/O may be issued and accordingly a number of outstanding I/Os is decremented, 58, whereupon the process returns to the test of block 56 in order to decide which I/O to do next if an IOQ event occurs, the device returns to 46 and queues this new command. The key thing about the loop just described is that it ensures that the system will never go above the limit set on the bus in block 56.

Continuing with block 56 of FIG. 4, if the outstanding I/Os is less than the limit, flow exits to the right of block 56 to block 60, at which the next I/O to do is selected. What is relevant at this point in the process to ensuring the deterministic jitter requirement is met is that the first thing that the "select" function examines is the VCR Queue so that if any deterministic commands are in the queue, they will be selected first. This is to ensure that these high priority VCR commands get priority over any other commands flowing through box 48.

There are three outcomes which could occur from execution of the "select next I/O" function of block 60. First, as represented by path "A", an I/O could have been successfully issued, in which case the counter of outstanding I/Os may be incremented at block 62, whereupon additional I/Os may be issued by returning to block 56 to perform the limit test. In the alternative, as represented by path "B", no buffer space may remain for issuing I/Os. This consequence is a side effect of the Limit in block 56 of how many I/Os will be permitted on the bus at one time, tested at block 56. The system must be certain that I/Os do not block. For example, if one I/O is allowed on the bus, and an I/O is performed to a card and the card blocks the I/O, typically this I/O block will occur from a card if the card has no buffer space to store the I/O. In other words, if an attempt is made to a write to a card and the card is already full, the card will not provide an I/O done indication, signifying the I/O is complete until the card first has the space available to store the data, at which time it will in fact indicate that the I/O is done. Thus, in the illustration if a Play command were to come in, it would have to wait longer than the 15 millisecond time and potentially much longer, depending of course on how fast the video or other data on the data stream was going out. If in the Pause mode wherein data is not going out, in that case definitely the jitter requirement would not be met. This would also cause serious underutilization of the SCSI bus, and probably cause starvation at the other decoder cards which would lead to QOS failures. Accordingly, this scenario is one of the scenarios checked in the "Select" function in block 60. In other words, before a Write command is issued, a check is made to ensure that buffer space is available on the card to perform the write. If no adequate buffer space is available, shown by path B, a timer is simply set and the process sleeps, waiting for something else to happen, block 64, and flow eventually returns to block 56 because I/Os cannot be issued at present without buffer space.

Continuing with FIG. 4, the third case tested in the Select function of block 60 is whether any more I/Os are available for processing. If not, shown by path C at this point two alternatives are possible. Either a new IOQ event could be occurring or one of the IOQs currently executing could complete as an I/Odone. The process therefore sleeps, waiting for another IOQ event, 68, or, in the alternative, the path C will flow to block 54 to await an I/O Done or IOQ.

FIG. 5 described in greater detail the flow hereinbefore described with respect to the Select function of block 60 in FIG. 4. The process enters at block 70 at which a check is made to determine whether a VCR command is present on the VCR CMD QUEUE. If true, the command is issued, 72, at which point the path A of FIG. 4 is followed. This VCR command can be issued immediately because it cannot block because it does not require buffer space. If a VCR command is not present as tested by block 70, flow exits to the left therefrom for a test of other things the device is required to do. The process enters block 74, indicating that the following events will be executed with respect to each card before flow exits out the bottom of block 74. The following steps to be described are essentially for two reasons. At this point it is necessary to determine if there is space available to do the writes, and secondly it is desired prioritized I/Os so that the system does the next write to the card which needs it the most.

For each card on the bus, state information is maintained, including how much buffer space is available in each card. Typically, decoder cards include buffers of varying sizes dependent upon the card but typically on the order of two megabytes. These cards typically may further have mechanisms for querying the card to determine how much of the buffer is currently in use and how much is available which the driver may utilize to keep track of these states for each card. In the implementation being described, these capabilities of cards are employed such that when commands are issued to cards querying for how much buffer space is available, this value is stored with a timestamp. Thus, the system described herein can look at any time and determine how much buffer space is available on the cards 20 or 30. In the implementation herein described, such a function is referred to as a "modesense". Thus, at block 76, such a function is employed to determine whether the previously acquired value of buffer space is "obsolete".

The system admits to various more precise definitions of the meaning of "obsolete" but generally the operative concept is as follows. The value previously determined for the buffer state or space available may have been determined too long ago to be reliable and it may be desirable to refresh it. This refreshment may be done on a static basis, e.g., at regular predetermined intervals such as every X seconds. Alternatively, it is also typically possible to query the various cards to determine how fast they are playing data, e.g., the "playrate". Given the known amount of data at some time when the card was queried and stored in the buffer and the playrate for the card, the available buffer space could continually be updated over time. However, this updating mechanism would not be relied upon indefinitely because an error may occur on the card, the actual current playrate may differ from that previously queried, and the like. Thus it is desirable to still periodically query the card again for available buffer space.

With the foregoing in mind, the meaning of block 76 may now be understood, namely that at some point in time dependent upon criteria of choice dictated by characteristics of the card, system, data, and the like, the previous information regarding each card and available buffer space acquired by means of execution of the modesense function may need to be updated again by actual reference to the card, e.g., the state data may be "obsolete". In such event, a next modesense I/O command may be issued to the particular card, 78, so as to effect the updating of the information pertinent to the card regarding available buffer space, playrate, etc., whereupon the process continues along path A.

At the completion of the aforementioned steps 76, 78, for each card, at the exit at the bottom of block 74, the process is in a state wherein it is known that up to date data is available for each card. At this point, a check is then made, block 80, to determine whether any queued I/Os are available to do in the regular device queues. If not, flow exits along path C to either sleep and await a next I/O queue event, block 68. At this point some I/Os may in fact be in progress but none would be actually queued and ready to go.

When the flow enters block 82, this signifies that it is known that I/Os are pending and that complete information is complete on all the cards (as a result of execution of steps 74, 76, 78 previously). At this point, steps are provided directed to effecting the objective of providing a predetermined quality of service (QOS). As in the case with block 74, the hereinafter described functions are performed with respect to each card before the process may exit out the bottom of block 82.

The processes to be performed with respect to each card are twofold. First, as represented by block 84 with respect to each card, the process will check to determine if enough buffer space is available to handle one more I/O on the card because it must be determined that a write I/O will not block the subsequent I/Os. Once this check has been made and passed satisfactorily at block 84, flow exits to the right of block 84 to block 86 to perform the second function relating to QOS. Obviously, if adequate buffer space is not available for the particular card, the process exits out the top of block 84 because an I/O operation cannot be performed and the particular card being queried is not a candidate for such an I/O operation inasmuch as adequate buffer space is not available as tested at block 84. If, on the other hand, adequate buffer space is available for the particular card under test, then a deadline is calculated for the next I/O, block 86. More particularly, at this point it is necessary to derive an estimate for how long the card can play, given the amount of data it has currently stored in its buffer.

There are various ways in which estimates may be arrived at as to what rate the card is playing at. This may be based upon what the system indicates or as an alternative, for example, this may be determined dynamically by examining data from consecutive mode senses. As to the latter, for example, it may be determined that in the last five seconds, for example, one megabyte of data has been written from which it might reasonably be concluded that the playrate is 0.2 megabytes per second, etc. In either case, regardless of how the rate is determined—either statically or dynamically once the playrate is known for a card and the number of buffers available is also known, a "deadline" as represented in block 86 may be arrived at, may be determined by which the next piece of data must be acquired by means of the next I/O.

Once the foregoing steps described in blocks 84–86 have been completed for each card, the process exits out the bottom of block 82. At this point one possibility is that even with outstanding I/Os, buffers of all the cards may be filled, as tested by block 88. In this case, even though I/Os remain to do, if all the cards are in a state wherein they cannot accept another write command because all of their buffers are full, in order to meet the jitter requirements, no other writes may be issued. In this case, the process exits to the left of block 88 along path B, whereupon the process sleeps, a timer is set, and the process comes back after a predetermined time to try again to effect a write. Obviously at some point a subsequent write attempt will be successful because the cards are constantly emptying out their buffers. If the buffers are not all full, the process exits block 88 to the right and enters step 90. At this step, all of the deadlines determined at step 86 are examined and the card is selected corresponding to the earliest such deadline, which means that it has the least amount of playtime. This card is thus identified as the candidate to have issued to it a write I/O, 92, whereupon the process continues along path A. Accordingly the C path will return to block 54.

While the invention has been shown and described with reference to particular embodiments thereof, it will be understood by those skilled in the art that the foregoing and other changes in form and detail may be made therein without departing from the spirit and scope of the invention.

We claim:

1. A method for reliable execution of a VCR client command comprised of either an external client command or internal client command by a multimedia server in a multimedia datastream system having a data pump, comprising:
   receiving said client command in said system with a highest priority receiving thread;
   timestamping said received client command;
   establishing a deterministic response time window defined by a base time <bt> plus or minus a litter <i> for said client command with said system;
   executing said client command with said system within said window;
   wherein said system further includes an output side of a data pump, said window defines a lower bound <bt>−<j>; and wherein said client command is transferred from said control server to said output side in a time period less than said lower bound; and
   wherein said system includes a data pump defining a network access routine; and wherein said method further includes blocking said client command in a queue with said routine until it is in said window.

2. The method of claim 1 wherein said client command is a VCR transport command.

3. The method of claim 1 wherein said system includes a control server and wherein said receiving said client command is by said control server.

4. The method of claim 1 wherein said system further includes a decoder driver; and wherein said queue is in said driver.

5. The method of claim 4 wherein said queue is a VCR queue.

6. The method of claim 5 further including the steps of releasing said client command from said queue; and issuing I/Os from said queue within the time of 2j.

7. The method of claim 6 wherein said I/Os are non-blocking.

8. The method of claim 7 further including limiting the number of concurrent said I/Os to a predetermined number.

9. An apparatus for reliable execution of a VCR client command comprised of either an external client command or internal client command by a multimedia server in a multimedia datastream system having a data pump with an output side, comprising:

means for receiving said client command in said system with a highest priority receiving thread means for timestamping said received client command;

means for establishing a deterministic response time window defined by a base time <bt> plus or minus a jitter <i> for said client command with said system;

means for executing said client command with said system within said window;

wherein said window defines a lower bound <bt>−<j>; and wherein said system further includes means for transferring said client command to said output side in a time period less than said lower bound;

wherein said data pump means defines a network access routine; and wherein said apparatus further includes means for blocking said client command in a queue until it is in said window.

10. The apparatus of claim 9 wherein said client command is a VCR transport command.

11. The apparatus of claim 10 wherein said window is defined by a base time <bt> plus or minus a jitter <j>.

12. The apparatus of claim 11 wherein said system includes a control server and wherein said receiving said client command is by said control server.

13. The apparatus of claim 9 wherein said system further includes a decoder driver; and wherein said queue is in said driver.

14. The apparatus of claim 13 wherein said queue is a VCR queue.

15. The apparatus of claim 14 further including means for releasing said client command from said queue; and means for issuing I/Os from said queue within the time of 2J.

16. The apparatus of claim 15 wherein said I/Os are non-blocking.

17. The apparatus of claim 16 further including means for limiting the number of concurrent said I/Os to a predetermined number.

18. A method for reliable execution of a VCR client command comprised of either an external client command or internal client command by a multimedia server in a multimedia datastream system, comprising:

receiving from an application server said VCR client command in a highest priority receiving thread in a control server in said system;

determining if said VCR client command requires a deterministic response;

dropping priority of said thread and processing said VCR client command in response to said determining indicating that said deterministic response in not required;

in response to determining that said deterministic response is required,
placing a timestamp <ts> on said VCR client command; and
moving said VCR client command to a data pump in said system;

receiving said VCR client command by a high priority data pump thread;

blocking said VCR client command at an analog network access routine;

determining whether a current time <ct>−<ts>=<dr>−<j>, where <dr> is a deterministic response and <j> is jitter;

in response to an affirmative check that <ct>−<ts>=<dr>−<j>
sending said VCR client command to a VCR Queue in a decoder driver in said system; and
issuing an I/O with said decoder driver within a time 2J.

* * * * *